United States Patent [19]

Wallace

[11] 4,279,943

[45] Jul. 21, 1981

[54] METHOD OF PROVIDING RING PATCH FOR NUTS

[75] Inventor: Richard B. Wallace, Bloomfield Hills, Mich.

[73] Assignee: The Oakland Corporation, Troy, Mich.

[21] Appl. No.: 116,016

[22] Filed: Jan. 28, 1980

[51] Int. Cl.³ .............................................. B05D 7/22
[52] U.S. Cl. ...................................... 427/57; 427/238; 427/239; 427/273; 427/336; 427/355; 427/277; 427/375; 427/348; 118/408; 118/421; 118/693
[58] Field of Search ....................... 118/408, 693, 421; 264/267, 268, 269; 427/238, 239, 273, 57, 336, 355, 277, 375, 348

[56] References Cited

U.S. PATENT DOCUMENTS

| 1,621,016 | 3/1927 | Jackson | 118/408 |
|---|---|---|---|
| 2,349,444 | 5/1944 | McGowan | 118/408 |
| 2,455,129 | 11/1948 | Lepperhoff | 118/408 |
| 2,821,491 | 1/1958 | Fleming | 427/336 |
| 3,224,411 | 12/1965 | Blaha et al. | 118/408 |
| 3,294,139 | 12/1966 | Preziosi | 118/408 |
| 3,830,902 | 8/1974 | Barnes | 118/408 |
| 3,995,074 | 11/1976 | Duffy et al. | 427/239 |
| 4,020,198 | 4/1977 | Cornelius et al. | 427/336 |

Primary Examiner—Ralph S. Kendall
Attorney, Agent, or Firm—Whittemore, Hulbert & Belknap

[57] ABSTRACT

Quantity production of friction nuts prepared for subsequent fusion of thermoplastic resin particles deposited in thread grooves therein, in which the nuts are supported with their axes vertical, a fluid slurry of the particles in a liquid carrier is introduced into the threaded interior of the nuts to fill the threaded opening, including the thread grooves therein, to a predetermined level from the bottom of the nuts. Excess slurry is then drained from the bottom ends of the openings. In order to leave the threads clear of obstruction at the bottom of the nut, the deposited slurry, after partially drying, is removed from the bottom thread convolutions by repeatedly inserting and withdrawing a sponge-like material directly into and out of the lower end of the thread opening, or by strongly agitating a small quantity of water in the lower part of the threaded opening.

34 Claims, 8 Drawing Figures

METHOD OF PROVIDING RING PATCH FOR NUTS

BACKGROUND AND SUMMARY OF THE INVENTION

The problem of providing an annular or ring patch of fused thermoplastic material bonded to the thread groove surfaces at the interior of a nut has long posed difficulties.

The end desired result is a nut having a complete 360° ring of thermoplastic material, such as nylon 11, bonded in the thread grooves to the thread surfaces in such a way as to leave the end convolutions free of deposit to facilitate threading onto a mating article.

In the past, two different solutions to the problem have been proposed. In one the nut is first heated and then dry powdered resin is blown onto the hot threads. This method is disclosed in Duffy U.S. Pat. No. 3,896,760. In the other, dry powdered resin is deposited in the threads, and suitably confined as by a pin, and the entire assembly, including the pin, is subsequently heated while maintaining the pin and nut in a predetermined spacial orientation. Such an operation is disclosed in Newnon U.S. Pat. No. 3,975,897, for example.

Both of these operations, which require the application of dry resin powder to a hot nut, or retaining the powder on the nut while it is heated, require complicated and expensive equipment and are inherently difficult to carry out.

In my prior copending application. Ser. No. 892,505, these objections are overcome and the resin is provided in an efficient manner to the thread surfaces where it may subsequently be fused while the nuts are randomly positioned in bulk. In this prior application, the powdered resin is provided in a fluid slurry which is applied to the threads at the interior of a nut by slinging the slurry radially outwardly from a zone located within the threaded nut opening. In order to obtain quantity production it is necessary to provide for insertion and withdrawal of slinging mechanism relative to the nut opening which in turn requires advancing a series of nuts intermittently.

In accordance with the present invention, a series of nuts are advanced continuously with their thread axes vertical, and the threaded openings are filled with fluid slurry to a predetermined height, leaving the top few thread convolutions clear of slurry. Thereafter the slurry is permitted to drain downwardly, leaving in the thread grooves up to the level to which the threaded openings were filled a deposit of slurry which assumes an outwardly concave meniscus surface, the precise contour of which is determined by the fluidity or viscosity of the slurry. The excess slurry is captured in a drain receptacle for re-use. The nuts are further advanced during which the slurry may partially dry.

Finally, the slurry is removed from the bottom few thread convolutions, thus leaving an intermediate ring or band of slurry extending around an annular zone within the threaded interior of the nut spaced from both ends thereof.

The liquid carrier of the slurry deposit is substantially eliminated, and the nuts as so far treated contain essentially solid coherent annular deposits or resin particles within the thread grooves of the nuts, in which the deposits are shaped to present outer concave meniscus surfaces, and in which the deposits are essentially formed of particles of thermoplastic resin, such as nylon 11. These nuts are ready for subsequent heating to fuse the resin particles into essentially solid resin deposits fused to the thread surfaces, in which the shape of the initial slurry deposit in the thread grooves is preserved. This is found to be true, even if the pre-treated nuts are heated in bulk in which the individual nuts occupy random positions.

DETAILED DESCRIPTION

Figure 1:
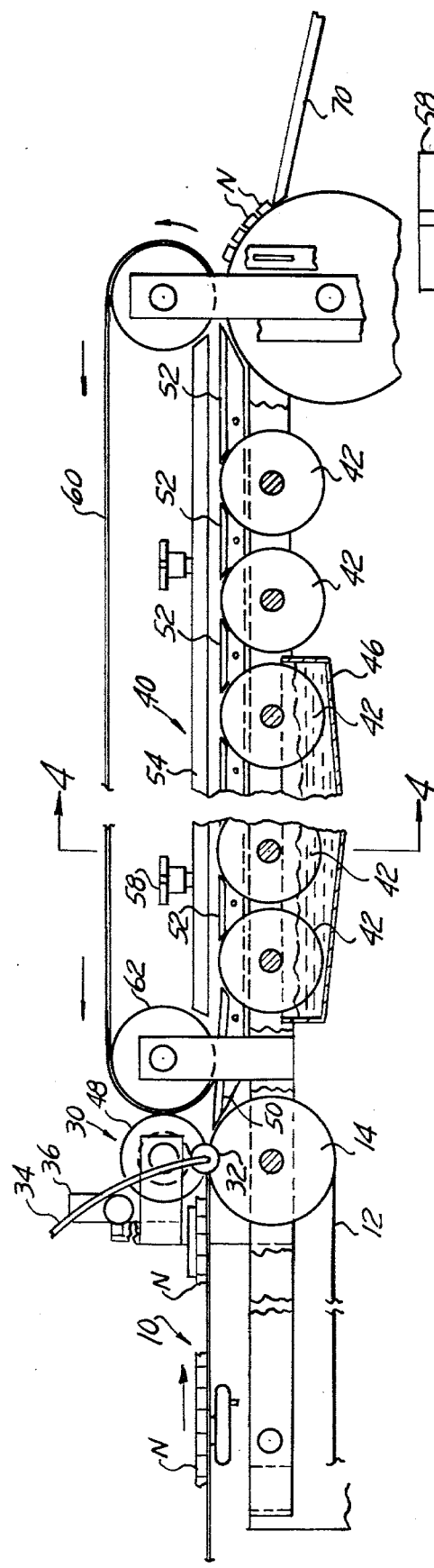
FIG. 1 is a diagrammatic side elevation of the apparatus for carrying out the present invention.
Figure 2:
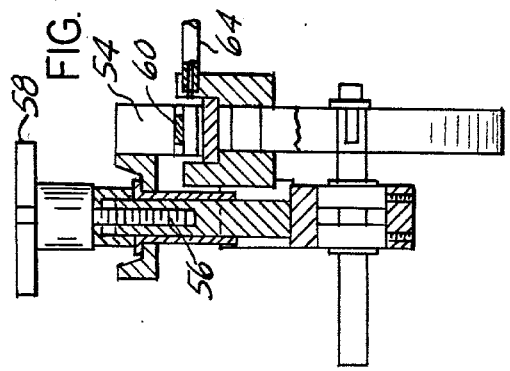
FIG. 2 is an enlarged sectional view on the line 2—2, FIG. 1.
Figure 3:
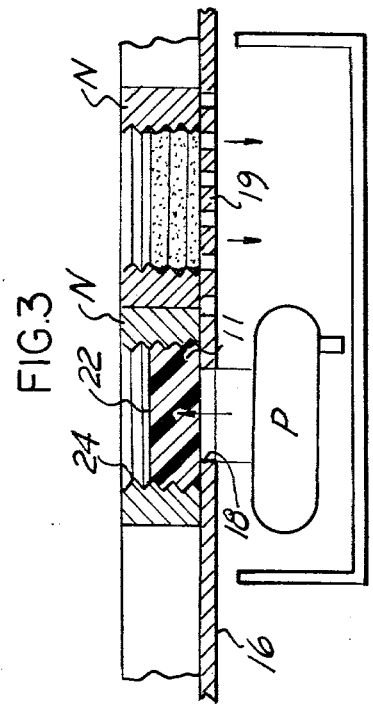
FIG. 3 is an enlarged diagrammatic view showing the step of filling the threaded openings with slurry to a predetermined height.
Figure 5:
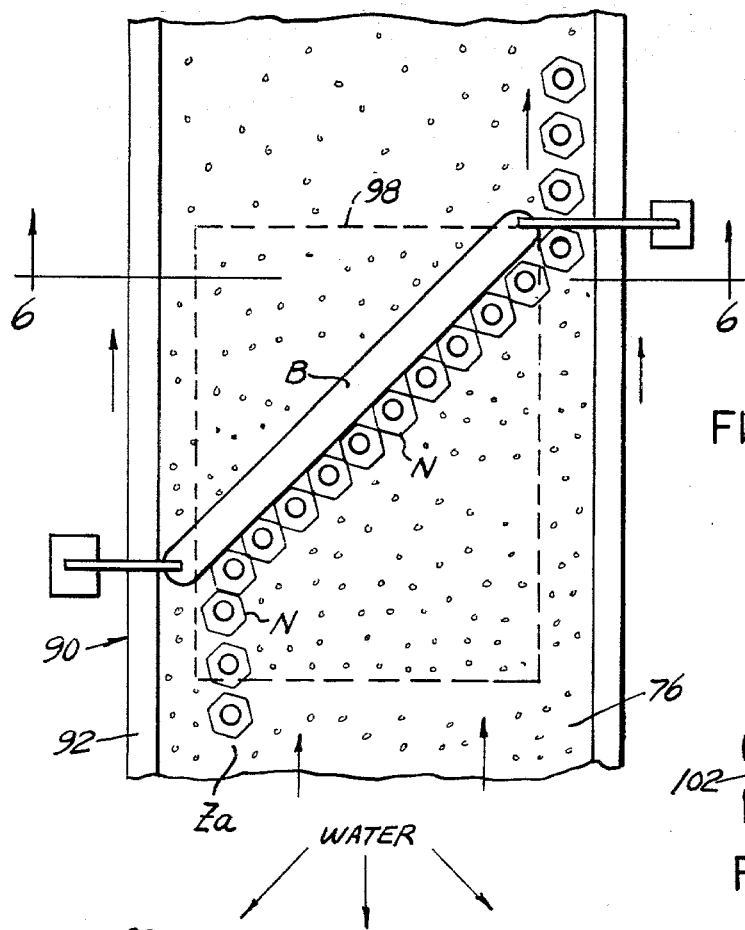
FIG. 5 is a fragmentary plan view illustrating an alternate operation for removal of slurry from the lower portion of the threaded openings.

A series of nuts N are advanced from left to right past a filling station indicated generally at 10 in FIG. 1, details of which are shown in FIG. 3. The nuts are advanced through the filling station 10 by any suitable means. For example they may be advanced in a solid array with flat surfaces in contact simply by the impetus imparted to them by a conventional vibratory feeder. Additional feeding force may be applied by belts 12, advanced by rollers 14, the belts engaging lateral edge portions of the nuts, and feeding them forwardly over a flat horizontal support 16 having an opening 18 over which the nuts N advance. Alternatively, the nuts may be supported and advanced by a belt such as 12 having a multiplicity of openings for communication with a pump P.

Excess slurry is drained away through openings 19, leaving a deposit of slurry only within the thread grooves at the lower ends of the nuts, as seen in FIG. 3.

A slurry receptacle 20 is provided beneath support 16, and is preferably provided with agitating means to keep the solid particles of the slurry in suspension.

The pump P is provided which delivers the fluid slurry upwardly through opening 18 to fill the interior of nuts N to a predetermined level as indicated at 22, leaving the top few thread convolutions clear as indicated at 24. This may be accomplished by controlling the volumetric flow of the pump in relation to the rate of advance of the nuts, so that as each nut traverses the filling station, it is filled to a predetermined level with the fluid slurry.

At 30 in FIG. 1 there is indicated a cleaning station where any slurry on the exterior at the nuts N is removed by suitable means such as an air jet supplied from a nozzle 32 connected to an air pressure line 34, and exhausted through a vacuum horn 36. Alternatively the exterior nut surfaces may be cleaned by spraying and/or brushing.

The nuts N, with the slurry at least partially dried to prevent further downward flow along the thread grooves of the nuts, now proceed to the thread clearing station 40, where the slurry is removed or cleared from the bottom thread convolutions.

Figure 4:
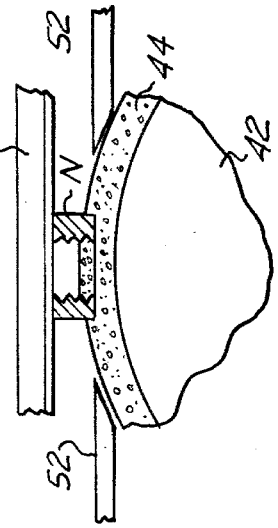
FIG. 4 is a diagrammatic view showing removal of slurry from the lower portion of the threaded openings.

At this station there is provided a plurality of clearing rolls 42, each of which is provided with an outer layer or "tire" formed of a soft sponge-like material, for example a urethane sponge, as seen at 44 in FIG. 4. A plurality of these rolls, as for example six, are associated with a tank 46 containing a quantity of the liquid constituting the carrier of the slurry, which may be water. The lower portion of rolls 42 are submerged in this liquid, which washes away the slurry removed from the thread grooves of the nuts, and moistens the sponge-like material to improve its action in clearing the slurry deposit from the lower ends of the threaded openings. This recovers substantially all of the resin particles removed from the nuts at station 40.

The nuts are engaged between an upper roller 48 and the lower roller 14 and are thus positively pushed forward in a solid array over rolls 42. Between roll 14 and the initial clearing roll 42 there is bridging element 50, and intermediate the further rolls 42 are similar bridging elements 52.

An adjustable pressure bar 54 is provided in position above rolls 42, and is adjustably supported by screws 56 connected to hand wheels 58. Slidable against the lower surface of bar 54 is a feed belt 60, which is preferably a rubber faced steel belt with its rubber surface engaging the top surface of nuts N and advancing them over rolls 42 and across bridging elements 52. Belt 60 is on rollers 62, one of which is power driven.

Referring now to FIG. 4, it will be seen that as each nut traverses a roll 42, the sponge material 44 is compressed except at the threaded opening at the lower end of the nut. At this point the uncompressed sponge moves substantially directly into and then out of the threaded opening. Since the first several rolls 42 are partly submerged in the liquid in tank 46, the sponge-like material is at least moist, and preferably substantially saturated and performs an efficient wiping action which removes the slurry to the height to which the sponge material extends into the opening, as seen in FIG. 4. If desired the last few rolls (here seen as two) may not be partly submerged in the liquid and will perform a wiping, drying function, since by this time preceding rolls 42 have substantially completely removed the slurry.

It is important that the sponge material be limited to only substantially direct insertion and removal relative to the threaded openings, since the thread crests, and intersections with the lower end of the nut are sharp, and any relative movement between the nuts and the contacting sponge-like material in the direction of advance, or any other horizontal direction, would quickly destroy the sponge-like material. For this reason, each of the rolls 42 is mounted for free rotation, preferably on ball or roller bearings, and are individually rotated solely by the advance of the nuts in contact therewith.

If desired additional air jets may be provided along the path of advance of the nuts as indicated at 64, and suitable provision made for collecting any resin particles removed thereby.

It is desired to emphasize that the present invention provides for large quantity, fully automatic production.

The treated nuts pass over a stripper ramp 70 and may be received in random orientation in a basket or container for subsequent insertion into an oven for fusing the resin particles into an essentially solid state, and fusing the resin to the thread surfaces to provide an effective bonding thereto.

A resin which has proved to be entirely satisfactory in this procedure is nylon 11. The particle size of the powder may vary with the size of the thread, but powder of electrostatic fineness is preferred, since this has less tendency to settle out of a slurry. Electrostatic fineness refers to a powder such as used in deposition in an electrostatic field.

If desired, the bond between the fused resin and the thread surface may be enhanced by inclusion in the resin a small percentage of a resin such as epoxy resin.

While a slurry composed of only the thermoplastic resin powder, such as nylon 11, and the liquid carrier, such as water, forms a sufficiently cohesive deposit of the powder when substantially dried, it will be understood that a very small amount of a binder may be employed. For example about 1% by volume of ethylene oxide has proved to be satisfactory. However, in the nuts the dried slurry deposit is well protected by its position within the central portion of the threaded opening, and no binder is ordinarily required.

It is stressed that the entire operation disclosed herein, in preparing the nuts for subsequent heating, is or may be carried out at ambient or room temperature. On the other hand, initial or partial drying of the slurry deposit may be accelerated by warming the nuts, or by directing drying air over and/or through the nuts subsequent to draining excess slurry from them. In any case, they are not heated to anything approaching the fusion temperature of the resin particles.

Referring now to FIGS. 5-8, there is illustrated an alternative procedure for removing the slurry from the deposit in the thread grooves at the lower end of the nuts as they advance.

It will be recalled that in the method as previously described, the nuts, after having a deposit of fluid slurry provided in the thread grooves in the threaded opening to a level somewhat below the tops of the nuts as they advance as on a belt or guide means with their axes vertical, were subjected to substantially direct, radial, repeated insertion of wet sponge. It has now been found that surprisingly, insertion of sponge or other solid material is not necessary.

Figure 7:
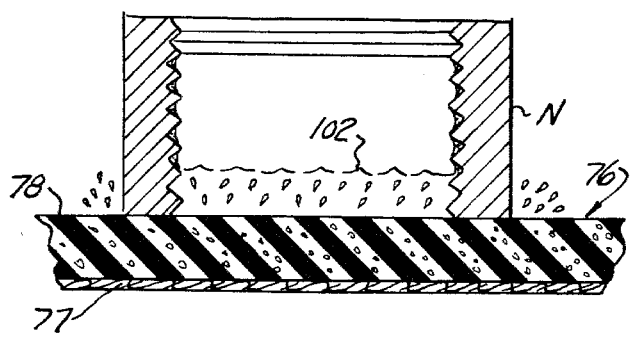
FIG. 7 is an enlarged section through a nut with a suggested illustration of the mode of operation.
Figure 8:
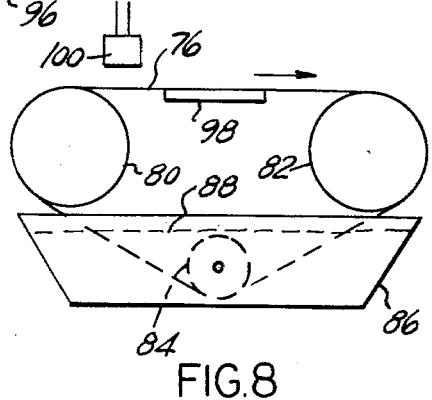
FIG. 8 is a diagrammatic showing of the belt and bath.

Nuts N, pretreated as described in the method illustrated in FIG. 4, up to entry onto ramp 50, are supplied to an advancing belt 76 which as best seen in FIG. 7 has a fabric backing 77, which may be canvas, and a layer 78 of soft absorbent sponge material, such for example as urethane. This belt is advanced over rollers 80, 82, one of which will be power driven, and a guide roller 84 which is rotatable in a tank 86 containing water to a level as indicated at 88. The belt is thus advanced through the tank, and the resin of the resin deposit removed from the thread grooves is recovered for reuse, as for example by return to tank 20, FIGS. 1 and 3.

In its upper horizontal run between rolls 80, 82, the belt is guided on a horizontal support 90, which as shown has edge flanges 92 between which there is a flat horizontal support web 94. Intermediate the rolls 80, 82 there is provided a vibrator 96 which as illustrated includes a plate 98 in contact with the underside of the web 94 in the area indicated in dotted lines in FIG. 5. Alternatively, plate 98 may directly contact the lower fabric surface of belt 76, as through an opening (not shown) in web 94.

In order to utilize belt 76 most efficiently, nuts N are deposited at one edge of the belt, as at zone Za. An inclined transfer bar B is provided in the vibratory zone 98, so that as the nuts advance with the belt 76, they are shifted to the opposite edge of the belt as shown. This insures that substantially the entire width of the belt, which is several times greater than the transverse dimension of the individual nuts, is utilized, and as each nut shifts transversely of the belt as it traverses the vibratory zone, it moves across fresh, fully saturated sponge portions.

Excellent results have been obtained using a vibrator of the type used in vibratory feeding, having a frequency of 40-100 cps, preferably about 60 cps, and an amplitude of 0.001-0.005 inches, which may be about the same as used in vibratory feeding in equipment sold under the trademark Syntron.

Since the sponge belt emerges from the water bath just before it passes around roll 80, the sponge will be substantially saturated. However, if too much water is removed by passing around roll 80, additional water may be added by a spray head 100.

It will be noted that flanges 92 extend above the sponge belt 76 and prevents water flowing laterally off the edges of the belt. The continuous advance of the belt carries water in and on the upper surface of the belt along to where it eventually is returned to tank 86.

The height to which the resin deposit is removed from thread grooves, illustrated at 102 in FIG. 7 depends at least substantially on the amount of water carried in and on sponge belt 76. If extra water is added by spray 100, including some in the threaded interior of the nuts, resin will be removed to a higher level, leaving more thread convolutions clear of resin deposit to facilitate threading onto a mating member.

The illustration of FIG. 7 is not intended to indicate a static water level with the nut N at 102, but instead to indicate a zone in which water particles are strongly agitated into contact with the lower thread portions and so to wash or rinse away the resin deposit thereat.

It is to be particularly noted that the nuts N are retained on the belt 76 only by gravity, and the vibration to which the belt is subjected does not cause displacement of the nuts on or away from the belt. The vibration of the at least substantially saturated sponge surface of the belt apparently produces agitation of particles or droplets of the liquid carrier (water) which impinge the interior thread surfaces to a height controlled by the frequency and amplitude of vibration, and by the quantity of liquid carrier trapped within the nuts. The at least partially dried slurry above the annular zone from which the carrier removes the deposit is unaffected.

Accordingly, the nuts are prepared for subsequent heating to fuse the intermediate band of resin particles, leaving one and preferably both ends of the threaded portion clear to facilitate threading with mating members.

Figure 9:
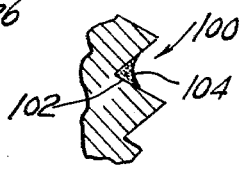
FIG. 9 is a fragmentary sectional view showing the shape of the deposit in a thread groove.
Figure 6:
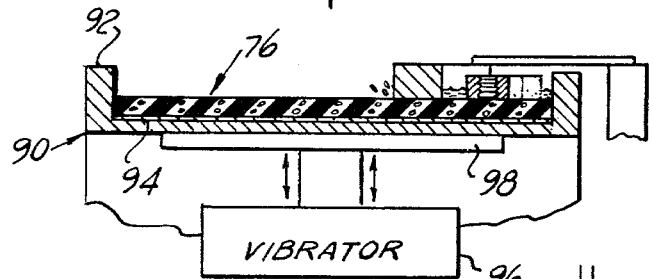
FIG. 6 is a sectional view on line 6—6, FIG. 5.

In the preliminary treatment of the nuts, the slurry as it is applied as best seen in FIG. 3 is quite fluid, and the excess slurry drains freely through openings 19, or from the open lower ends of the nuts, which may be supported only on edge support flanges (not shown) for this purpose. However, as a result of gravity, surface tension, and apparently as affected by capillary action and the viscosity of the slurry, some of the fluid slurry remains in the thread grooves and flows down the thread groove to form deposits as seen in FIG. 9, where it will be seen the bottom of the thread groove 100 is filled as indicated at 102, while the outer surface 104 of the deposit is concave and becomes tangent to the thread surface at or near the crests of the thread. The deposit of slurry, having assumed the shape seen in FIG. 9, retains this shape even while as fluid as when deposited. However, the slurry quickly loses moisture and becomes at least partially dried. The subsequent removal of the at least partially dried slurry is effectively carried out whether the deposit remains fluid, or is even fully dried, since it is a treatment involving application of the liquid carrier, either in the sponge portion inserted in the threaded opening or in the form of agitated particles or droplets of liquid carrier resulting from the vibratory action.

It will be appreciated that a substantial energy saving results from eliminating the necessity of fusing the resin powder as the nuts advance, and simply collecting a quantity of treated nuts in random disposition for placement in a conventional oven for simultaneous fusion of the dried deposits of slurry, essentially the resin powder component.

An important feature of the present invention is that it permits large volume rapid production of friction nuts in an economic feature which is particularly characterized in saving the energy required to raise the temperature so as to fuse the resin particles.

As illustrated, the nuts advance without manual handling from initial deposit on the horizontal support 16 until they exit the slurry applying mechanism as by the stripper slide 70, which is illustrated in the apparatus in FIG. 1 and which of course may be applied to remove finished nuts as the belt 76 passes around roller 82.

In addition, while as illustrated the nuts are advanced in a single column, it will be appreciated that if desired a solid array of nuts having a width equal to a plurality of nuts may be advanced continuously so that the quantity production may be extremely large. One reason for the efficiency of the procedure is that the nuts are continuously advanced as they are treated as disclosed herein, and may be collected in bulk for subsequent heat treatment in which the deposit of thermoplastic resin particles is fused, as for example in ovens capable of heat treating a large quantity of nuts simultaneously.

I claim:

1. The method of providing a threaded nut with a solid annular coherent deposit of particles of a thermoplastic resin in the threaded interior thereof and spaced from at least one end thereof to provide a narrow circumferentially extending zone at said one end of the nut which is clear of the deposit to facilitate initiating threading onto a mating threaded part, the nut being prepared for subsequent heating to fuse the particles to form an annular zone within the nut opening in which the resin forms a solid deposit within the thread grooves and is bonded to the thread surfaces throughout said annular zone, the method comprising the steps of providing a deposit of a fluid slurry of thermoplastic resin particles in a liquid carrier in the thread grooves within the nut which deposit extends around the nut and to one end of the nut, drying the deposit sufficiently to prevent substantial fluid flow thereof and thereafter removing the deposit from thread grooves in a narrow circumferential zone extending inwardly from the said one end of the nut by the application of liquid carrier to the deposit at said one end of the nut to remove the deposit from the said narrow circumferentially extending zone, all at temperatures at least substantially below the fusion temperature of the resin particles.

2. The method as defined in claim 1, in which the temperature at which the slurry is applied to the nut is substantially room temperature.

3. The method as defined in claim 1, which comprises repeatedly inserting and removing a moist sponge-like resilient compressible material directly into the said one end of the threaded opening in the nut at said one end of the nut to pick up and remove the deposit from the said narrow circumferentially extending zone, while preventing any relative movement between the nut and sponge-like material other than substantially direct insertion and removal of the material into and out of the threaded interior of the nut.

4. The method as defined in claim 3, which comprises maintaining the sponge-like material in moist condition to facilitate its wiping action.

5. The method as defined in claim 3, in which the sponge-like material is provided on the periphery of a plurality of rollers, and in which the insertion and removal of the material into the said one end of the threaded opening is accomplished by moving the nut substantially tangentially past the rollers in interfering relation thereto as the rollers rotate in timed relation to advance of the nuts.

6. The method as defined in claim 5, which comprises advancing the nut and using the advance of the nut in contact with the rollers to rotate the rollers.

7. The method as defined in claim 1, which comprises positioning the nut with the threaded openings vertical and with the said one end of the threaded openings lowermost, and repeatedly inserting and withdrawing the sponge-like material into bottom of the threaded openings.

8. The method as defined in claim 7, which comprises supporting a plurality of rollers with the sponge-like material on their peripheries for rotation about horizontal axes, advancing a series of nuts substantially tangentially over the rollers in interfering relation thereto, and providing a rotation of the rollers timed to the advance of the nuts such that the sponge-like material moves substantially directly into and out of the bottom portions of the threaded openings.

9. The method as defined in claim 8, which comprises mounting the rollers for free rotation, positively advancing the nuts, and rotating the rollers solely by their engagement with the advancing nuts.

10. The method as defined in claim 9, which comprises providing a trough beneath the rollers containing the liquid which forms the liquid carrier for the particles of the slurry, rotating the lower portions of the rollers through the liquid to recover the particles removed from the nuts for re-use and to present the cleaned sponge-like material in moist condition to subsequently advancing nuts.

11. The method as defined in claim 9, which comprises directly fluid jets against exterior surfaces of the nuts as they advance so that as prepared for subsequent fusion of the polymer particles, the deposit of particles and slurry is substantially limited to the said annular zone intermediate the ends of the threaded openings therein.

12. The method as defined in claim 1, in which the step of providing the deposit of the slurry in the threaded opening of the nut is accomplished by advancing nuts horizontally, with its thread axis vertical, feeding the slurry upwardly into the bottom of the threaded opening to fill the opening only to a height which leaves the upper end of the threaded opening clear, and draining the excess slurry from the threaded openings.

13. The method as defined in claim 12, which comprises removing any slurry deposit on the exterior surfaces of the nut.

14. The method as defined in claim 12, which comprises advancing the nut over a receptacle, feeding the slurry upwardly into the lower portion of the thread opening by pumping the slurry at a constant rate proportioned to the rate of advance of the nut upwardly from the receptacle, and draining the excess slurry from the nut as it advances back into the receptacle for re-use.

15. The method as defined in claim 14, which comprises advancing a solid series of nuts horizontally with flat sides of adjacent nuts in contact at a predetermined constant rate proportioned to the rate of delivery of slurry from the pump.

16. The method of providing a threaded nut with a solid annular coherent deposit of particles of a thermoplastic resin in the threaded interior thereof and spaced from at least one end thereof to provide a narrow circumferentially extending zone at said one end of the nut which is clear of the deposit to facilitate initiating threading onto a mating threaded part, the nut being prepared for subsequent heating to fuse the particles to form an annular zone within the nut opening in which the resin forms a solid deposit within the thread grooves and is bonded to the thread surfaces throughout said annular zone, the method comprising the steps of providing a deposit of a fluid slurry of thermoplastic resin particles in a liquid carrier in the thread grooves within the nut which deposit extends around the nut and to one end of the nut, drying the deposit sufficiently to prevent substantial fluid flow thereof, and removing the at least partially dried fluid slurry by supporting the nut with its axis vertical on a horizontal surface, confining a small amount of the liquid carrier within the lower part of nut on the surface, and vibrating the surface at a frequency of 30–100 cps.

17. The method as defined in claim 16, in which the surface is provided by a soft sponge-like material saturated with the carrier and providing liquid carrier within the nut to a depth of less than the annular zone from which the at least partially dried slurry is removed.

18. The method as defined in claim 16, in which the liquid carrier is water.

19. The method as defined in claim 16, which comprises vibrating the sponge-like material at an amplitude of 0.001–0.005 inches.

20. The method as defined in claim 16, which comprises placing the nuts on the sponge surface to be retained thereon only by gravity.

21. The method as defined in claim 16, in which the sponge surface is provided by an endless belt, which comprises advancing the belt horizontally, feeding nuts with at least partially dried slurry therein onto the belt to advance therewith, and providing vibrations as aforesaid to the belt at a limited zone.

22. The method as defined in claim 20, in which the sponge surface is provided by an endless belt, which comprises advancing the belt horizontally, feeding nuts with at least partially dried slurry therein onto the belt to advance therewith, and providing vibrations as aforesaid to the belt at a limited zone.

23. The method as defined in claim 22, which comprises advancing a lower run of the endless belt through a bath of the carrier to remove resin particles therefrom and to resaturate the sponge with liquid carrier.

24. The method as defined in claim 1, which comprises advancing the nut continuously during the provision of the resin slurry and the removal of the resin slurry from an end portion thereof.

25. The method of providing a deposit of a fluid slurry formed of thermoplastic resin particles in a liquid carrier into thread grooves at the interior of a series of nuts, which comprises supporting the series of nuts with their axes vertical, advancing the series of nuts continuously while introducing slurry from one end of the threaded openings therein to fill the openings from the lower end to a predetermined height therein, and draining the excess slurry as the nuts advance to leave a deposit only in the thread grooves from the lower ends of the nuts to said predetermined height.

26. The method as defined in claim 25, which comprises introducing the slurry to fill the thread convolutions sequentially upwardly from the lower end of the nuts.

27. The method as defined in claim 26, which comprises introducing the slurry through the open bottom ends of the nuts.

28. The method of preparing a plurality of nuts for a subsequent heat treatment which comprises continuously advancing a series of threaded nuts with their threaded openings disposed vertically during the continuous advance of the nuts, first filling at least the lower portions of the openings with a fluid slurry of resin particles and liquid carrier, second draining excess fluid slurry from the nut openings to leave a deposit of the fluid slurry in the bottoms of the thread grooves, third drying the deposit sufficiently to prevent substantial flow thereof, and fourth removing the deposited slurry from the thread grooves extending from the bottom surfaces of the nuts to a predetermined distance above the bottom surfaces to leave the bottom thread convolutions clear to facilitate threading with a mating article.

29. The method as defined in claim 28, which comprises filling the nuts only to a predetermined level below the top surfaces of the nuts to leave the top thread convolutions clear to facilitate threading.

30. The method as defined in claim 28, in which removal of deposited slurry from the bottom thread convolutions is accomplished by applying liquid carrier as used in the slurry to the deposits as the nuts continue to advance.

31. The method as defined in claim 30, in which the application of liquid carrier is by repeated insertion and withdrawal of substantially saturated sponge material into and out of the bottom ends of the threaded openings of the nuts.

32. The method as defined in claim 30, in which the application of liquid carrier is by confining a small quantity of liquid carrier within the bottom of the threaded opening in the nuts, and agitating the liquid by vibration to direct liquid droplets to the deposits of slurry to a predetermined height above the bottoms of the nuts.

33. The method of preparing a multiplicity of nuts for subsequent heat treatment which comprises continuously advancing a series of nuts with their threaded openings disposed vertically over a flat horizontal support having an opening with which the threaded openings of the nuts register during continued advance, supplying a fluid slurry of thermoplastic resin particles in a liquid carrier upwardly through the opening in the support into the interior of the threaded nut openings, determining the depth to which the threaded openings are filled with fluid slurry by regulating the rate of advance of the nuts and the rate of supply of the slurry, and draining slurry from the threaded nut openings by continuing the advance of the nuts across drain opening means in the support to leave slurry essentially only in the thread grooves of the lower ends of the nuts.

34. The method as defined in claim 33, in which the nuts are hexagonal, and which comprises advancing them with adjacent flat side surfaces in contact.

* * * * *